| United States Patent [19] | [11] Patent Number: 4,843,132 |
|---|---|
| Werner et al. | [45] Date of Patent: Jun. 27, 1989 |

[54] PREPARATION OF HOMO- AND COPOLYMERS OF PROPENE USING A ZIEGLER-NATTA CATALYST SYSTEM

[75] Inventors: Rainer A. Werner, Bad Durkheim; Ralf Zolk, Hessheim, both of Fed. Rep. of Germany

[73] Assignee: BASF Aktiengesellschaft, Ludwigshafen, Fed. Rep. of Germany

[21] Appl. No.: 176,861

[22] Filed: Apr. 1, 1988

[30] Foreign Application Priority Data

Apr. 8, 1987 [DE] Fed. Rep. of Germany ....... 3711919

[51] Int. Cl.$^4$ ................................................. C08F 4/64
[52] U.S. Cl. .................................... 526/125; 526/351; 502/120
[58] Field of Search ................................ 526/125, 351

[56] References Cited

U.S. PATENT DOCUMENTS

| 4,113,933 | 9/1978 | Schweier et al. | 526/125 X |
| 4,399,054 | 8/1983 | Ferraris et al. | 526/125 X |
| 4,431,571 | 2/1984 | Karayannis | 526/125 X |
| 4,467,044 | 8/1984 | Band | 526/125 X |
| 4,579,919 | 4/1986 | Staiger et al. | 526/124 X |

FOREIGN PATENT DOCUMENTS

| 543049 | 3/1985 | Australia . |
| 14523 | 8/1980 | European Pat. Off. . |
| 17895 | 10/1980 | European Pat. Off. . |
| 45977 | 2/1982 | European Pat. Off. . |
| 144021 | 6/1985 | European Pat. Off. . |
| 0171200 | 2/1986 | European Pat. Off. . |
| 0206172 | 12/1986 | European Pat. Off. . |
| 2049709 | 12/1980 | United Kingdom . |
| 2101609 | 1/1983 | United Kingdom . |
| 2101611 | 1/1983 | United Kingdom . |
| 2143834 | 2/1985 | United Kingdom . |

*Primary Examiner*—Patrick P. Garvin
*Attorney, Agent, or Firm*—Keil & Weinkauf

[57] ABSTRACT

Polymers of propene are prepared using a Ziegler-Natta catalyst system consisting of (1) a titanium component which contains titanium, magnesium, chlorine and a benzenecarboxylic acid derivative on a carrier, (2) an aluminum component and (3) a silane component. The process employs a titanium component (1) which is obtained by a method in which (1.1) first a solid-phase intermediate is prepared from (I) magnesium chloride, (II) an alkanol, (III) a carrier which in turn consists of a finely divided inorganic oxide carrier material which has been pretreated with an alkylchlorosilane, (IV) titanium tetrachloride and (V) a phthalic acid derivative, in such a way that (1.1.1) first (I) is reacted with (II), (1.1.2) then the carrier (III) is introduced into the substance resulting from (1.1.1), (1.1.3) thereafter the solid-phase substance resulting from (1.1.2) is reacted with (IV) in a liquid hydrocarbon, with the proviso that (V) is also introduced in (1.1.1) or (1.1.2) or (1.1.3), the (1.2) the solid-phase substance resulting from (1.1) is extracted with titanium tetrachloride, and finally the solid-phase substance resulting from (1.2) is extracted with a liquid hydrocarbon.

1 Claim, No Drawings

PREPARATION OF HOMO- AND COPOLYMERS OF PROPENE USING A ZIEGLER-NATTA CATALYST SYSTEM

The present invention relates to a process for the preparation of homopolymers of propene and copolymers of propene with minor amounts of other $C_2$–$C_{12}$-α monoolefins, in particular $C_2$–$C_6$-α-monoolefins, by polymerization, in particular dry-phase polymerization, of the monomer or monomers at from 20° to 160° C., in particular from 50° to 120° C., and under from 1 to 100 in particular from 20 to 70, bar using a Ziegler-Natta catalyst system consisting of (1) a titanium component which contains titanium, magnesium, chlorine and a benzenecarboxylic acid derivative on a carrier, (2) an aluminum component of the formula $$AlR_3,$$

where R is alkyl of not more than 8, in particular not more than 4, carbon atoms, and (3) a silane component of the formula $$R^1{}_n Si(OR^2)_{4-n},$$

where $R^1$ is an aryl, alkylaryl or alkyl radical of not more than 16, preferably not more than 10, carbon atoms, in particular phenyl, tolyl or ethylphenyl, $R^2$ is alkyl of not more than 15, preferably not more than 8, in particular not more than 4, carbon atoms and n is from 0 to 3, preferably from 0 to 2, in particular 1 to 2, with the provisos that the atomic ratio of titanium from the titanium component (1) to aluminum from the aluminum component (2) is from 1:10 to 1:800, in particular from 1:20 to 1:200, and the molar ratio of aluminum component (2) to silane component (3) is from 1:0.03 to 1:0.8, in particular from 1:0.05 to 1:0.5.

Polymerization processes of this type are known; their special feature compared with other similar processes is the special embodiment of the catalyst system, and the processes disclosed in European Laid-Open application Nos. 17,895 and 144,021, European Pat. No. 45,977, Australian Pat. No. 543,049 and British Pat. No. 2,143,834 may be mentioned as prototypes for the present case.

The special embodiments of the catalyst systems are produced in order to achieve certain aims, such as the following:

The catalyst system should be easy to prepare and give an increased yield of polymer having a very large isotactic fraction. In addition, particularly because of the thermodynamics of the procedure, easy molecular weight regulation, in particular with hydrogen, is of great importance.

The catalyst system should moreover produce polymers having special morphological properties, for example uniform particle size and/or smaller fractions of very fine particles and/or a high bulk density. In addition to these parameters which are important for controlling the polymerization systems, working up the polymers and/or processing the latter, a low halogen content in the polymer is of importance, particularly with regard to corrosion problems; this can be achieved by increasing the polymer yield and/or by means of a catalyst system which contains very little halogen.

Some of these aims can be achieved by the prior art only by means of very expensive processes, as is the case, for example, with the process according to U.S. Pat. No. 4,399,054, or when other aims are neglected.

For example, British Pat. No. 2,049,709 discloses a process in which a magnesium halide, a titanium halide and an electron donor are applied to a metal oxide carrier. However, the polymer obtained has a comparatively low isotacticity.

European Laid-Open application Nos. 14,523 and 171,200 and British Pat. Nos. 2,101,609 and 2,101,611 describe catalyst systems whose titanium component is obtained by treating a solid, inorganic oxide with an organic magnesium compound, a Lewis base and titanium tetrachloride, it being necessary in addition to use a halogenating agent which is not titanium tetrachloride and/or an organic compound of the metals boron, aluminum, silicon or tin or a boron trihalide or a halogen-containing alcohol. Despite an expensive and tedious preparation procedure, the productivity of the corresponding catalyst system is unsatisfactory.

U.S. Pat. No. 4,467,044 discloses a catalyst system which contains, as a titanium component, a silica carrier, a magnesium halide and/or manganese halide, a titanium halide and an electron donor. In order to obtain catalyst systems having relatively high productivity, additional treatment with an organometallic compound of a metal of groups I to III of the periodic table is indispensable here. However, the productivity and stereospecificity of the catalysts prepared in this manner are, in absolute terms, low.

The known processes are thus unsatisfactory, in particular with regard to high isotacticity and good morphology coupled with good productivity.

It is an object of the present invention to provide a titanium component which, compared with the prior art processes, has high productivity and is at the same time capable of giving polymers having high isotacticity and good morphology.

We have found that this object is achieved by a catalyst system which contains a titanium component (1) prepared in three stages in a particular manner from (I) magnesium chloride, (II) a certain alkanol, (III) a certain carrier comprising finely divided inorganic oxide carrier material which has been pretreated with an alkylchlorosilane, (IV) titanium tetrachloride and (V) a specially selected phthalic acid derivative.

The present invention accordingly relates to a process for the preparation of homopolymers of propene and copolymers of propene with minor amounts of other $C_2$–$C_{12}$-α-monoolefins, in particular $C_2$–$C_6$-α-monoolefins, by polymerization, in particular dry-phase polymerization, of the monomer or monomers at from 20° to 160° C., in particular from 50° to 120° C., under from 1 to 100, in particular from 20 to 70, bar using a Ziegler-Natta catalyst consisting of (1) a titanium component which contains titanium, magnesium, chlorine and a benzenecarboxylic acid derivative on a carrier, (2) an aluminum component of the formula $$AlR_3,$$

where R is alkyl of not more than 8, in particular not more than 4, carbon atoms, and (3) a silane component of the formula $$R^1{}_n Si(OR^2)_{4-n},$$

where $R^1$ is an aryl, alkylaryl or alkyl radical of not more than 16, preferably not more than 10, carbon atoms, in particular phenyl, tolyl or ethylphenyl, $R^2$ is alkyl of not more than 15, preferably not more than 8, in particular not more than 4, carbon atoms and n is from 0 to 3, preferably from 0 to 2, in particular 1 or 2, with the provisos that the atomic ratio of titanium from the titanium component (1) to aluminum from the aluminum component (2) is from 1:10 to 1:800, in particular from 1:20 to 1:200, and the molar ratio of aluminum component (2) to silane component (3) is from 1:0.03 to 1:0.8, in particular from 1:0.05 to 1:0.5.

In the novel process, the titanium component (1) used is one which is obtained by a method in which first (1.1) in a first stage, a solid-phase intermediate is prepared from (I) finely divided magnesium chloride, (II) a $C_1$-$C_8$-alkanol, preferably a $C_2$-$C_6$-alkanol, in particular a $C_2$-$C_4$-alkanol, (III) a carrier consisting of a finely divided, porous, inorganic oxide carrier material which has a particle diameter of from 1 to 1,000 μm, in particular from 10 to 400 μm, a pore volume of from 0.3 to 3, in particular from 1 to 2.5, cm$^3$/g and a surface area of from 100 to 1,000, in particular from 200 to 400, m$^2$/g, is of the formula $SiO_2 \cdot a\, Al_2O_3$, where a is from 0 to 2, in particular from 0 to 0.5, and has been pretreated with an alkylchlorosilane of the formula $R^3{}_mSiCl_{4-m}$, where $R^3$ is $C_1$-$C_{10}$-alkyl, preferably $C_1$-$C_4$-alkyl and m is from 1 to 3, preferably 2 or 3, in particular 3, in such a way that either (A) the carrier material and the alkylchlorosilane are combined once or several times, in particular twice, in a liquid inert hydrocarbon, in particular an alkane, with constant thorough mixing at from 20° to 160° C., in particular from 60° to 120° C., a total of from 1 to 50, in particular from 3 to 20, molar parts of the alkylchlorosilane being used per 10 molar parts of the carrier material, and a total of from 20 to 200, in particular from 40 to 120, molar parts of the hydrocarbon being used per 10 molar parts of the alkylchlorosilane, and the combined substances are kept at from 20° to 160° C., in particular from 60° to 120° C., for a total of from 0.1 to 5, in particular from 0.4 to 2, hours, and the resulting solid is then isolated as the carrier (III), or (B)

the carrier material and the alkylchlorosilane are combined with constant thorough mixing at from 20° to 140° C., in particular from 40° to 100° C., from 5 to 50, in particular from 10 to 40, molar parts of the alkylchlorosilane being used per 10 molar parts of the carrier material, and the combined substances are kept at a temperature in the stated range for from 0.1 to 5, in particular from 0.4 to 2, hours, and the resulting solid is then isolated as the carrier (III), (IV) titanium tetrachloride and (V) a phthalic acid derivative of the formula

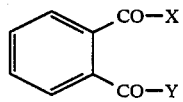

where X and Y together form oxygen or X and Y are each chlorine or $C_1$-$C_{10}$-alkoxy, preferably $C_2$-$C_8$-alkoxy, in particular chlorine, in such a way that first either (a)

(1.1.1.a) in a first substage, the magnesium chloride (I) and the alkanol (II) are combined in a liquid inert hydrocarbon, in particular an alkane, with constant thorough mixing at from 0° to 140° C., in particular from 40° to 120° C., from 20 to 1,000, in particular from 50 to 400, parts by weight of the hydrocarbon being used per 10 parts by weight of the magnesium chloride (I) and from 10 to 80, in particular from 20 to 60, molar parts of the alkanol (II) being used per 10 molar parts of the magnesium chloride (I), and the combined substances are kept at from 20° to 140° C., in particular from 40° to 120° C., for from 0.1 to 6, in particular from 0.2 to 2, hours, after which (1.1.2.a) in a second substage, the carrier (III) is introduced into the reaction mixture resulting from the first substage, with constant thorough mixing at from 0° to 140° C., in particular from 40° to 120° C., from 20 to 100, in particular from 30 to 60, parts by weight of the carrier (III) being used per 10 parts by weight of the magnesium chloride (I), or (b)

(1.1.1.b) in a first substage, the magnesium chloride (I) and the alkanol (II) are combined with constant thorough mixing at from 0° to 140° C., in particular from 40° to 120° C., from 100 to 1,000, in particular from 150 to 500 molar parts of the alkanol (II) being used per 10 molar parts of the magnesium chloride (I), and the combined substances are kept at from 20° to 140° C., in particular from 40° to 120° C., for from 0.1 to 6, in particular from 0.2 to 2, hours, after which (1.1.2.b) in a second substage, the carrier (III) is introduced into the reaction mixture resulting from the first substage with constant thorough mixing at from 0° to 140° C., in particular from 40° to 120° C., from 20 to 100, in particular from 30 to 60, parts by weight of the carrier (III) being used per 10 parts by weight of the magnesium chloride (I), and the entire mixture is evaporated to dryness with recovery of a solid-phase reaction product, and thereafter (1.1.3) in a third substage, the solid-phase reaction product obtained in the second substage and the titanium tetrachloride (IV) are combined in a liquid inert hydrocarbon, in particular an alkane, with constant thorough mixing at from $-20°$ to $40°$ C., in particular from 10° to 30° C., from 20 to 300, preferably from 30 to 200, in particular from 50 to 150, molar parts of the titanium tetrachloride (IV) being used per 100 molar parts of the alcohol (II), and from 10 to 100, preferably from 10 to 80, in particular from 15 to 60, parts by weight of the hydrocarbon being used per 10 parts by weight of the carrier (III), and the combined substances are kept at from 10° to 150° C., in particular from 30° to 120° C., for from 0.1 to 4, in particular from 0.2 to 2.5, hours, and the resulting solid-phase intermediate is isolated with removal of the liquid phase, with the proviso that the phthalic acid derivative (V) is introduced in the course of one or more of the substages (1.1.1) to (1.1.3), from 1 to 100, preferably from 5 to 60, in particular from 10 to 40, molar parts of the phthalic acid derivative being used per 100 molar parts of the magnesium chloride (I), then (1.2) in a second stage, the solid-phase intermediate obtained from the first stage is subjected to a single-stage or multi-stage or continuous extraction with titanium tetrachloride at from 100° to 150° C., in particular from 115° to 135° C., for from 0.2 to 5, in particular from 0.4 to 3, hours, a total of from 10 to 1,000, preferably from 20 to 800, in particular from 40 to 300, parts by weight of the titanium tetrachloride being used per 10 parts by weight of the solid-phase intermediate obtained from the first stage, and finally (1.3) in a third stage, the solid-phase intermediate obtained in the second stage is extracted with a liquid inert hydrocarbon, in particular an alkane, until the solid contains from 0.01 to 30, preferably from 0.03 to 20, in particular from 0.05 to 10, % by weight of free titanium tetrachloride, and the titanium component (1) is obtained in this manner.

Regarding the novel process, the following may be stated specifically:

Provided that the defining feature is taken into account, the polymerization process as such can be carried out in virtually all relevant conventional technological embodiments, for example as a batchwise, cyclic or, in particular, continuous process, either as a suspension polymerization process or, in particular, a dryphase polymerization process. The stated technological embodiments, i.e. the technological variants of the polymerization of α-monoolefins by the Ziegler-Natta method, are well known from the literature and in practice and therefore require no further description.

For the sake of completeness, it may be stated that, in the novel process, it is also possible to regulate the molecular weights of the polymers by the relevant conventional measures, for example using regulators such as, in particular, hydrogen.

Regarding the composition of the novel catalysts, the following may be stated specifically:

(1) The liquid inert hydrocarbon to be used for the preparation of the titanium component may be a hydrocarbon of the type usually combined with titanium components for catalyst systems of the Ziegler-Natta type without causing damage to the catalyst system or its titanium component. Examples of suitable hydrocarbons are pentanes, hexanes, heptanes, gasolines and cyclohexane.

The finely divided magnesium chloride (I) likewise to be used may be a relevant conventional one. It should be essentially anhydrous, i.e. its water content should not exceed 1% by weight of the total amount of magnesium chloride.

The alkanols (II) to be used for the preparation of the titanium component (1) may be conventional ones; they should advantageously have relatively high purities. Examples of suitable alkanols are ethanol, n-propyl alcohol, isopropyl alcohol, n-butyl alcohol, isobutyl alcohol and tert-butyl alcohol, n-butanol being particularly suitable.

The carrier (III) furthermore to be used generally contains, as a base material, an aluminosilicate or, in particular, silica; it is important that it has the required properties; it has been found that the relevant conventional commercial carrier materials which meet the stated specification are suitable. Alkylchlorosilanes suitable for the preparation of the carrier are monoalkyltrichlorosilanes, dialkyldichlorosilanes and trialkylmonochlorosilanes, trialkylmonochlorosilanes being particularly suitable and trimethylchlorosilane being preferred.

The titanium tetrachloride (IV) likewise to be used for the preparation of the titanium component (1) should be one which is conventionally used in Ziegler-Natta catalyst systems.

Furthermore, the phthalic acid derivative (V) defined above can be a commercial one; it should advantageously be very pure. It has been found that phthaloyl dichloride is very particularly suitable for the purpose according to the invention; however, phthalic anhydride and the dialkyl phthalates, in particular di-n-butyl phthalate, are also suitable.

The alkane to be used for the preparation of the titanium component (1) in stage (1.3) may likewise be a conventional one; it should advantageously have a relatively high purity.

The preparation of the titanium component (1) is simple and can be carried out by the skilled worker without explanations. Regarding stages (1.1), (1.2) and (1.3), it is merely necessary to state that the isolation of the particular resulting solid is advantageously carried out by filtration under suction, which in stage (1.1) should advantageously be followed by washing with a liquid, inert hydrocarbon until the latter no longer absorbs any titanium tetrachloride. It has been found that it may also be advantageous if the solid-phase reaction product obtained in the second substance (1.1.2.a) is isolated before being used in the third substage (1.1.3), for example by evaporation to dryness.

(2) Suitable aluminum components (2) of the stated formula are the relevant conventional ones of this formula; they are sufficiently well known from the literature and in practice to require no further discussion. An outstanding member is, for example, triethylaluminum.

(3) The silane component (3) which completes the catalyst system is, in particular, a trialkoxy(alkyl)aryl- or dialkoxydi(alkyl)arylsilane of the stated formula. Outstanding members are triethoxytolyl-, triethoxy(ethylphenyl)-, dimethoxyditolyl- and dimethoxydi(ethylphenyl)silane; other examples are trimethoxytolyl-, trimethoxy(ethylpheny)- and trimethoxyphenylsilane, triethoxyphenylsilane, dimethoxydiphenylsilane, and diethoxyditolyl-, diethoxydi(ethylphenyl)- and diethoxydiphenylsilane.

The novel process permits homo- and copolymers, for example of the binary or ternary type, including block copolymers, of propene with minor amounts of other $C_2$-$C_{12}$-α-monoolefins to be prepared in an advantageous manner, particularly suitable α-monoolefins as comonomers be polymerized being ethene, but-1-ene, 4-methylpent-1-ene and hex-1-ene; other suitable examples are n-oct-1-ene, n-dec-1-ene and n-dodec-1-ene.

EXAMPLE 1

Preparation of the titanium component (1)

The process is carried out as follows: first (1.1) in a first stage, a solid-phase intermediate is prepared from (I) finely divided magnesium chloride, (II) n-butanol, (III) a carrier consisting of a finely divided, porous, inorganic oxide carrier material which has a particle diameter of from 20 to 45 μm, a pore volume of 1.75 $cm^3/g$ and a surface area of 320 $m^2/g$, is of the formula $SiO_2$ and has been pretreated with trimethylchlorosilane in such a way that the carrier material and the alkylchlorosilane are combined twice in n-heptane with constant through mixing by means of stirring at 65° C., in each case 4.2 molar parts, i.e. a total of 8.4 molar parts, of the alkylchlorosilane being used per 10 molar parts of the carrier material, and in each case 50 molar parts, i.e. a total of 100 molar parts, of the hydrocarbon being used per 10 molar parts of the alkylchlorosilane, and the combined substances are kept in each case for 0.5 hour, i.e. for a total of 1 hour, at 85° C., and the resulting solid is then isolated by filtration and washed with n-heptane to give the carrier (III), (IV) titanium tetrachloride and (V) phthaloyl dichloride, in such a way that first (1.1.1.a) in a first substage, the magnesium chloride (I) and the n-butanol (II) are combined in n-heptane with constant thorough mixing by means of stirring at from 40° to 50° C., 90 parts by weight of the n-heptane being used per 10 parts by weight of the magnesium chloride (I) and 60 molar parts of the n-butanol (II) being used per 10 molar parts of the magnesium chloride (I), and the combined substances are kept at the boiling point of the n-heptane (about 98° C.) for 0.5 hour, after which (1.1.2.a) in a second substage, the carrier (III) is introduced into the reaction mixture resulting from the first substage with constant thorough mixing by means of stirring at from 65° to 75° C., 40 parts by weight of the carrier (III) being used per 10 parts by weight of the magnesium chloride (I), and the entire mixture is left for 10 minutes at the stated temperature and then evaporated to dryness under reduced pressure, thereafter (1.1.3) in a third substage, the solid-phase reaction product obtained in the second substage and the titanium chloride (IV) are combined in n-heptane with constant thorough mixing by means of stirring at 25° C., 120 molar parts of the titanium tetrachloride (IV) being used per 100 molar parts of the n-butanol (II) and 20 parts by weight of the n-heptane being used per 10 parts by weight of the carrier (III), after which the phthaloyl dichloride (V) is introduced, 27 molar parts of the phthaloyl dichloride (V) being used per 100 molar parts of the magnesium chloride (I), the combined substances are kept at 100° C. for 0.25 hour while stirring, and the resulting solid-phase intermediate is isolated by filtration under suction with removal of the liquid phase, then (1.2) in a second stage, the solid-phase intermediate obtained in the first stage is subjected to a two-phase extraction with titanium tetrachloride at 125° C. for 0.5 hour in each stage, in each case 70 parts by weight, i.e. a total of 140 parts by weight, of the titanium tetrachloride being used per 10 parts by weight of the solid-phase intermediate obtained from the first stage, after which the resulting solid-phase intermediate is isolated by means of filtration, and finally (1.3) in a third stage, the solid-phase intermediate obtained in the second stage is extracted with n-heptane until the solid contains 3.8% by weight of free titanium tetrachloride, and the titanium component (1) is obtained in this manner.

Polymerization

A steel autoclave having a volume of 10 l and equipped with a stirrer is charged with 50 g of polypropene powder, 20 millimoles of triethylaluminum (in the form of a one molar solution in n-heptane) as the aluminum component (2), 2 millimoles of triethoxy-p-tolylsilane (in the form of a one molar solution in n-heptane) as the silane component (3), 5 liters (S.T.P.) of hydrogen and finally 0.18 millimole, calculated as titanium, of the titanium component (1) described above, at 30° C. The reactor temperature is brought to 70° C. in the course of 10 minutes and the reactor pressure is brought to 28 bar in this time by forcing in gaseous propene.

The actual polymerization is carried out with constant stirring at 70° C. and under 28 bar for 2 hours, monomer consumed being replaced continuously with fresh monomer.

The productivity of the catalyst component (1), the heptane-soluble fraction (as a measure of the isotacticity) and the particle size distribution of the resulting polymer are summarized in the Table below.

EXAMPLE 2

Preparation of the titanium component (1)

The process is carried out as follows: first (1.1) in a first stage, a solid-phase intermediate is prepared from (I) finely divided magnesium chloride, (II) n-butanol, (III) a carrier consisting of a finely divided, porous, inorganic oxide carrier material which has a particle diameter of from 20 to 45 $\mu$m, a pore volume of 1.75 cm$^3$/g and a surface area of 320 m$^2$/g, is of the formula SiO$_2$ and has been pretreated with trimethylchlorosilane in such a way that the carrier material and the alkylchlorosilane are combined with constant thorough mixing by means of stirring at 57° C., 24 molar parts of the alkylchlorosilane being used per 10 molar parts of the carrier material, and the combined substances are kept at the stated temperature for 1 hour, after which the resulting solid is isolated by filtration and washed with n-heptane to give the carrier (III), (IV) titanium tetrachloride and (V) phthaloyl dichloride, in such a way that first (1.1.1.b) in a first substage, the magnesium chloride (I) and the n-butanol (II) are combined with constant thorough mixing by means of stirring at from 25° to 30° C., 200 molar parts of the n-butanol (II) being used per 10 molar parts of the magnesium chloride (I), and the combined substances are kept at 118° C. for 0.5 hour, after which (1.1.2.b) in a second substage, the phthaloyl dichloride (V) is first introduced into the reaction mixture resulting from the first substage with constant thorough mixing by means of stirring at from 75° to 80° C., 30 molar parts of the phthaloyl dichloride (V) being used per 100 molar parts of the magnesium chloride (I), and then the carrier (III) is introduced, 40 parts by weight of the carrier (III) being used per 10 parts by weight of the magnesium chloride (I), and the entire mixture is left for 10 minutes at the stated temperature and then evaporated to dryness under reduced pressure with recovery of a solid-phase reaction product, thereafter (1.1.3) in a third substage, the solid-phase intermediate obtained in the second substage and the titanium tetrachloride (IV) are combined in n-heptane with constant thorough mixing by means of stirring at 25° C., 140 molar parts of the titanium tetrachloride (IV) being used per 100 molar parts of the n-butanol (II), and 50 parts by weight of the n-heptane being used per 10 parts by weight of the carrier (III), the combined substances are kept at 100° C. for 0.5 hour while stirring, and the resulting solid-phase intermediate is isolated by filtration under suction with removal of the liquid phase, then (1.2) in a second stage, the solid-phase intermediate obtained from the first stage is subjected to a two-stage extraction with titanium tetrachloride at 125° C. for 0.5 hour in each stage, in each case 70 parts by weight, i.e. a total of 140 parts by weight, of the titanium tetrachloride being used per 10 parts by weight of the solid-phase intermediate obtained in the first stage, after which the resulting solid-phase intermediate is isolated by filtration, and finally (1.3) in a third stage, the solid-phase intermediate obtained in the second stage is extracted with n-heptane until the solid contains 4.2% by weight of free titanium tetrachloride, and the titanium component (1) is obtained in this manner.

Polymerization

This is carried out as described in Example 1; the polymerization result obtained here is likewise shown in the Table below.

COMPARATIVE EXPERIMENT

Preparation of the titanium component

The procedure described in Example 1 of U.S. Pat. No. 4,467,044 is followed using, as a carrier, the carrier material defined in Example 1 of the present invention. The titanium component obtained contains 4.3% by weight of titanium.

Polymerization

A steel autoclave having a volume of 10 l and equipped with a stirrer is charged with 50 g of polypropene powder, 24 millimoles of triethylaluminum (in the form of a one molar solution in n-heptane) as the aluminum component, 1.08 g of methyl p-toluate, 60 mg of the titanium component and 5 liters (S.T.P.) of hydrogen at 30° C. The further procedure is carried out as described in Example 1 of the present invention.

The polymerization result obtained is once again shown in the Table below.

As shown in the Table, the catalyst component from the Comparative Experiment has a substantially lower productivity and stereospecificity than the catalyst components from the Examples according to the invention. Furthermore, the particle size distribution has shifted to a range of undesirably large particles.

that the atomic ratio of titanium from the titanium component (1) to aluminum from the aluminum component (2) is from 1:10 to 1:800, and the molar ratio of aluminum component (2) to silane component (3) is from 1:0.03 to 1:0.8, wherein the titanium component (1) used is one which is obtained by a method in which first (1.1) in a first stage, a solid-phase intermediate is prepared from (I) finely divided magnesium chloride,
(II) a $C_1$–$C_8$-alkanol,
(III) a carrier consisting of a finely divided, porous, inorganic oxide carrier material which has a particle diameter of from 1 to 1,000 $\mu$m, a pore volume of from 0.3 to 3 cm$^3$/g and a surface area of from 100 to 1,000 m$^2$/g, is of the formula SiO$_2$·a Al$_2$O$_3$, where a is from 0 to 2, and has been pretreated with an alkylchlorosilane of the formula $R^3_m SiCl_{4-m}$, where $R^3$ is $C_1$–$C_{10}$-alkyl and m is from 1 to 3, in such a way that either (A)
the carrier material and the alkylchlorosilane are combined once or several times, in a liquid inert hydrocarbon with constant thorough mixing at from 20° to 160° C., a total of from 1 to 50 molar parts of the alkylchlorosilane being used per 10 molar parts of the carrier material, and a total of from 20 to 200 molar parts of the hydrocarbon being used per 10 molar parts of the alkylchlorosilane, and the combined substances are kept at from 20° to 160° C., for a total of from 0.1 to 5 hours, and the resulting solid is then isolated as the carrier (III), or (B)
the carrier material and the alkylchlorosilane are combined with constant thorough mixing at from 20° to 140° C., from 5 to 50 molar parts of the

|  | Productivity (g of PP/g of cat.) | Heptane-soluble fractions (% by weight) | Particle size distribution (mm) | | | | |
|---|---|---|---|---|---|---|---|
|  |  |  | <0.25 | 0.25–0.5 | 0.5–1 | 1–2 | >2 |
| Example 1 | 6,810 | 2.8 | 5.4 | 16.1 | 69.5 | 8.7 | 0.3 |
| Example 2 | 7,300 | 2.3 | 1.7 | 6.3 | 73.2 | 18.4 | 0.4 |
| Comparative Experiment | 3,600 | 22.4 | 2.2 | 4.7 | 18.2 | 66.4 | 8.5 |

We claim:

1. A process for the preparation of homopolymers of propene and copolymers of propene with minor amounts of other $C_2$–$C_{12}$-$\alpha$-monoolefins by polymerization of the monomer or monomers at from 20° to 160° C. and under from 1 to 100 bar using a Ziegler-Natta catalyst system consisting of (1) a titanium component which contains titanium, magnesium, chlorine and a benzenecarboxylic acid derivative on a carrier,
(2) an aluminum component of the formula $AlR_3$, where R is alkyl of not more than 8 carbon atoms, and
(3) a silane component of the formula $R^1_n Si(OR^2)_{4-n}$, where $R^1$ is an aryl, alkylaryl or alkyl radical of not more than 16 carbon atoms, $R^2$ is alkyl of not more than 15 carbon atoms and n is from 0 to 3, with the provisos alkylchlorosilane being used per 10 molar parts of the carrier material, and the combined substances are kept at a temperature in the stated range for from 0.1 to 5 hours, and the resulting solid is then isolated as the carrier (III), (IV) titanium tetrachloride and
(V) a phthalic acid derivative of the formula

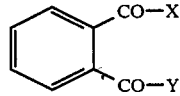

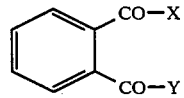

where X and Y together form oxygen or X and Y are each chlorine or $C_1$–$C_{10}$-alkoxy, in such a way that first either (a)

- (1.1.1.a) in a first substage, the magnesium chloride (I) and the alkanol (II) are combined in a liquid inert hydrocarbon with constant thorough mixing at from 0° to 140° C., from 20 to 1,000 parts by weight of the hydrocarbon being used per 10 parts by weight of the magnesium chloride (I) and from 10 to 80 molar parts of the alkanol (II) being used per 10 molar parts of the magnesium chloride (I), and the combined substances are kept at from 20° to 140° C., for from 0.1 to 6 hours, after which
- (1.1.2.a) in a second substage, the carrier (III) is introduced into the reaction mixture resulting from the first substage, with constant thorough mixing at from 0° to 140° C., from 20 to 100 parts by weight of the carrier (III) being used per 10 parts by weight of the magnesium chloride (I), or (b)

- (1.1.1.b) in a first substage, the magnesium chloride (I) and the alkanol (II) are combined with constant thorough mixing at from 0° to 140° C., from 100 to 1,000 molar parts of the alkanol (II) being used per 10 molar parts of the magnesium chloride (I), and the combined substances are kept at from 20° to 140° C. for from 0.1 to 6 hours, after which
- (1.1.2.b) in a second substage, the carrier (III) is introduced into the reaction mixture resulting from the first substage with constant thorough mixing at from 0° to 140° C., from 20 to 100 parts by weight of the carrier (III) being used per 10 parts by weight of the magnesium chloride (I), and the entire mixture is evaporated to dryness with recovery of a solid-phase reaction product, and thereafter

- (1.1.3) in a third substage, the solid-phase reaction product obtained in the second substage and the titanium tetrachloride (IV) are combined in a liquid inert hydrocarbon with constant thorough mixing at from −20° to 40° C., from 20 to 300 molar parts of the titanium tetrachloride (IV) being used per 100 molar parts of the alcohol (II), and from 10 to 100 parts by weight of the hydrocarbon being used per 10 parts by weight of the carrier (III), and the combined substances are kept at from 10° to 150° C., for from 0.1 to 4 hours, and the resulting solid-phase intermediate is isolated with removal of the liquid phase, with the proviso that the phthalic acid derivative (V) is introduced in the course of one or more of the substages (1.1.1) to (1.1.3), from 1 to 100 molar parts of the phthalic acid derivative being used per 100 molar parts of the magnesium chloride (I), then
- (1.2) in a second stage, the solid-phase intermediate obtained from the first stage is subjected to a singlestage or multi-stage or continuous extraction with titanium tetrachloride at from 100° to 150° C., for from 0.2 to 5 hours, a total of from 10 to 1,000 parts by weight of the titanium tetrachloride being used per 10 parts by weight of the solid-phase intermediate obtained from the first stage, and finally
- (1.3) in a third stage, the solid-phase intermediate obtained in the second stage is extracted with a liquid inert hydrocarbon until the solid contains from 0.01 to 30% by weight of free titanium tetrachloride, and the titanium component (1) is obtained in this manner.

* * * * *